July 3, 1962

A. S. JOHNSON 3,041,893

BALL-BEARING REVERSING TAPPING ATTACHMENT

Filed July 24, 1959

ALLAN S. JOHNSON,
INVENTOR.

BY HERZIG & JESSUP
ATTORNEYS.

Albert M. Herzig

United States Patent Office
3,041,893
Patented July 3, 1962

3,041,893
BALL-BEARING REVERSING TAPPING
ATTACHMENT
Allan S. Johnson, Newport Beach, Calif.
(845 W. 16th St., Costa Mesa, Calif.)
Filed July 24, 1959, Ser. No. 829,303
12 Claims. (Cl. 74—798)

This invention relates to thread-cutting or tapping attachments for use with drilling machines, lathes and boring machines in association with the spindle of the machine.

The invention resides in an improvement in the tapping attachment which is a ball-bearing reversing type. The attachment embodies an adjustable ball clutch whereby the torque applied to the tap can be limited. The clutch operates through a clutch sleeve which is journaled in a ball-bearing. A reversing sleeve is provided on the inside of a reversing ball-bearing and reverse rotation of the tap is achieved simply by lifting the tapping attachment which brings about reverse drive through the reversing ball-bearing. This structure as so far outlined is characteristic of tapping attachments known to the prior art.

The herein invention is directed to very significant improvement features in the type of tapping attachment referred to above. In the herein invention, a thrust bearing is provided between the direct drive ball-bearing and the reverse drive ball-bearing so that the axial thrust of the ball clutch is transmitted to the inner race of the reversing ball-bearing. The reversing ball-bearing is an angular contact bearing, i.e., the ball race or groove in the outer ring member of the bearing is not semi-cylindrical in cross-section; it is not symmetrical, this ring being thicker in cross-section on one side of the ball than the other. This type of bearing is used because the bearing must be taken apart to have a different ball retainer inserted which has a screw-threaded neck which is threaded to an end cap which is held from rotation by a stop-rod or torque bar. The retainer ring is held from rotation in this manner since it is necessary to do so to provide reverse drive through this bearing. In other words, the inner and outer rings of the bearing rotate in opposite directions, the inner ring being driven through the balls of the bearing.

It is a part of this invention that the reversing ball-bearing is modified from the ball-bearing that may be obtained commercially or from the factory. As stated, the bearing is taken apart for insertion of the ball retainer with the screw-threaded neck to be held against rotation by the stop-bar. Ball-bearings as obtained from the factory have a clearance of from .0010 to .0015 inch between the balls and the races. By this invention, that clearance is reduced to .0001 inch.

In driving a tap through a ball-bearing reversing mechanism, as known in the prior art, the apparatus was subject to certain quite serious limitations. Such devices could not run at over 800 or 900 revolutions per minute without undue friction and heating. In other words, the standard ball-bearings were not particularly adapted for use as reverse driving mechanisms. For efficient and effective operation and to minimize heating, it is desired that the balls revolve on a central axis, i.e., on an axis through the center of the ball. In prior art devices, the reversing bearing has been loaded by means of a nut acting against the outer ball race of the reversing bearing. Such an arrangement is operable to take up play in the bearing, using an angular bearing but the result is that the objective of having the balls revolve on a central axis is defeated. The balls then skid part of the time and due to the friction, the reverse drive is ineffective and subject to excessive heating which limits the speeds at which it can operate and reduces the total number of operating cycles to which its life is limited. With known devices, their life has been limited to a quarter-million cycles at 1,000 r.p.m. or less. With the device of this invention, the life has been extended to 1,000,000 cycles at speeds of 2,250 r.p.m. This results from the more effective transmission of drive through the ball bearing resulting from the modification of the bearing and that the balls revolve more truly on a central axis. Also from the fact that the reversing bearing is loaded from the axial force of the torque clutch, this thrust being applied to the inner race of the reversing bearing so that the balls are not displaced from an attitude in which they revolve on a central axis, that is, an axis through the center of the ball.

In accordance with the foregoing, a primary object of the invention is to make possible a higher speed and longer life ball-bearing reversing tapping attachment.

Another object is to realize the objectives and advantages in a tapping attachment as outlined in the foregoing.

Another object is to provide an improved ball-bearing reversing means in a tapping attachment wherein there is reduced clearance between the balls and the ball races and the reverse bearing is loaded through a thrust bearing from the torque clutch used with the attachment.

Further objects and additional advantages will become apparent from the following detailed description and annexed drawings wherein.

The general nature of the improvements of the herein invention have been outlined in the foregoing. The ensuing description is of a specific embodiment of the invention which is an exemplary illustration of a preferred mode and manner of practicing the invention.

Figure 2:
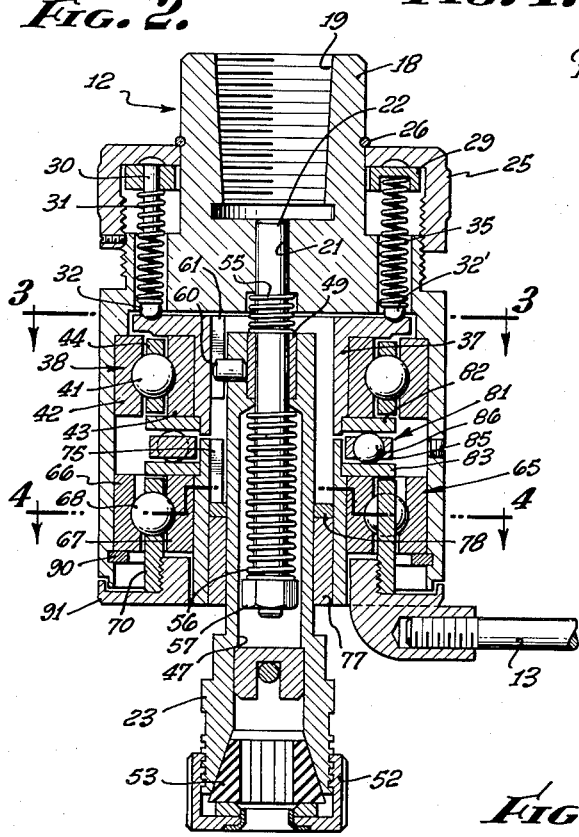
FIG. 2 is a cross-sectional view of a prefered form of the tapping attachment of the invention.
Figure 1:
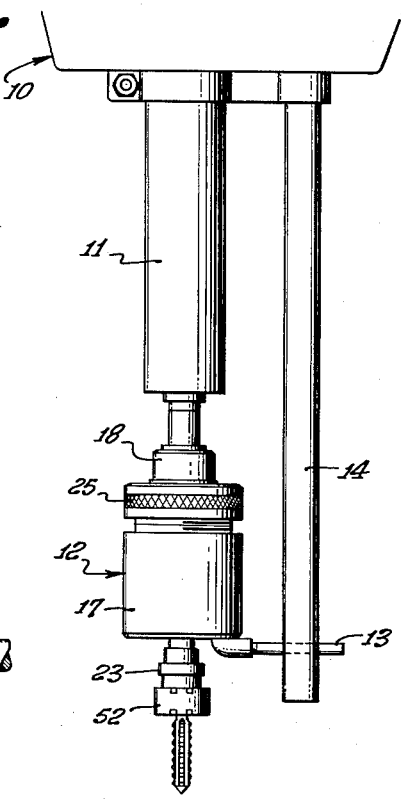
FIG. 1 is a view of the tapping attachment mounted on a driving tool or machine.

Referring to FIG. 1 of the drawings, numeral 10 designates the machine tool with which the attachment may be used. It has a spindle 11 and the tapping attachment of the invention is designated generally at 12. Numeral 13 designates a stop-rod which is held against rotation as will be described hereinafter by a vertical column 14 which is attached at the upper end to the machine 10 as shown.

The tapping attachment comprises a generally cylindrical housing 17 which is screw-threaded near the upper part and has an extending portion 18 of smaller diameter having a screw-threaded bore 19. The upper portion has a central bore 21 to receive the guide spindle 22 for the drive spindle for the tap.

A clutch is provided for limiting the torque that is applied to the tap while working so that the clutch will slip in the event of an over-load. Numeral 25 designates an internally threaded screw-cap or clutch adjustment cap which fits over the extending part 18 against a stop-ring 26. The adjustment cap 25 threads onto the upper part of housing 17. On the inside of the cap 25 is a spring plate or spring-retainer ring 29. Numeral 30 designates a spring-plate pin extending down through the member 29 and engaging the end of coil-spring 31, the lower end of which engages a clutch-drive ball 32. Numeral 35 designates a similar spring, the upper end of which seats in the retainer ring 29 and the lower end of which engages clutch drive ball 32'. The clutch drive balls ride in a circular groove in the upper face of a flange extending outwardly from the clutch or clutch member 37. The springs shown at 31 and 35 extend through vertical bores in the part of housing 17 of intermediate diameter.

The clutch member or clutch ring 37 is journaled in ball-bearing 38 comprising the balls 41, the ball races 42 and 43 and ball retainer ring 44.

Direct drive of the spindle of the tapping attachment is through the clutch as may be readily observed. The drive spindle 23 of the tapping attachment has a central bore 47 as shown and at its uper end it has a bore of smaller diameter in which is positioned guide spindle bearnig 49 through which extends the guide spindle 22. The construction at the lower end of the drive spindle 23 is generally conventional as known in the art. Numeral 52 designates a tap chuck nut threaded onto the end of the drive spindle and cooperating with a tap collet 53 which may be made of rubber or comparable material.

Interposed between the bearing 49 and a shoulder formed by a counter bore adjacent bore 21 is a coiled cushion spring 55. Numeral 56 designates a return spring on the guide spindle 21 within the drive spindle 23 and secured at its lower end by nut 57.

Figure 3:
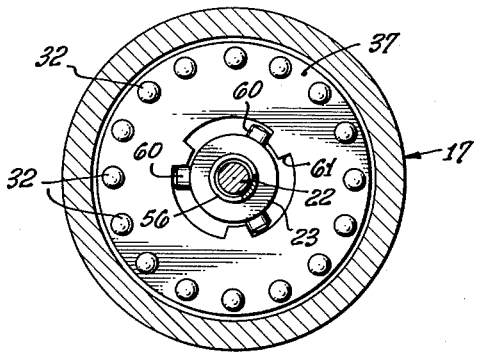
FIG. 3 is a sectional view taken along the line 3—3 of FIG. 2.

Numeral 60 designtaes the drive pins extending radially from the drive spindle 23 and which cooperate with splines or ribs 61 on the inside of the clutch 37. The arrangement is shown in cross-section in FIG. 3. As may be seen therefore whenever the attachment is rotated, the driving spindle 23 is driven through the ball clutch by way of the splines 61 and the driving pins 60.

The reversing ball-bearing is designated generally at 65. It is an angular contact bearing comprising the outer race 66, inner race 67, the balls 68 and the ball retainer 70. The outer race 66 is keyed to the housing 17 by a key 72. Numeral 73 designates a reversing sleeve which is attached to the inner race 67 of the reversing ball bearing 65. The reversing sleeve is provided with internal splines 75 which cooperate with and drive the driving pins 60 when the tapping attachment is lifted relative to the driving spindle 23 as will be described. Numeral 77 designates a drive spindle bearing between the reversing sleeve 73 and the barrel of the drive spindle 23. Numeral 78 designates an impact ring at the upper end of the spindle bearing 77.

Interposed between the bearings 38 and 65 is a thrust bearing designated generally at 81 comprising upper and lower thrust plates or rings 82 and 83, ball-retainer ring 85, and balls 86. The thrust plate or ring 82 engages an annular shoulder at the lower end of the clutch 37 as may be seen so that the axial thrust is transmitted axially through the thrust bearing to the inner race 67 of the reversing ball-bearing.

Numeral 90 designates a ring engaging in an annular groove on the inside of housing 17 and retaining the outer race 66 of the reversing ball-bearing 65.

The lower end of the ball retainer or retaining ring 70 is screw-threaded to ball retainer cap 91 which has a short upwardly extending flange as shown adjacent an annular shoulder at the lower end of housing 17. The stop-rod 13 is threaded into a boss on the ball retainer cap as shown to prevent rotation of the ball retainer 70.

It may be readily seen, as has been outlined more fully in the foregoing, that the axial thrust of the ball clutch is transmitted through the thrust bearing 81 to the inner race 67 of the reversing ball-bearing 65.

This is to be distinguished from exerting an upward axial thrust on the outer race 66 to take up any play in the angular bearing.

Figure 4:
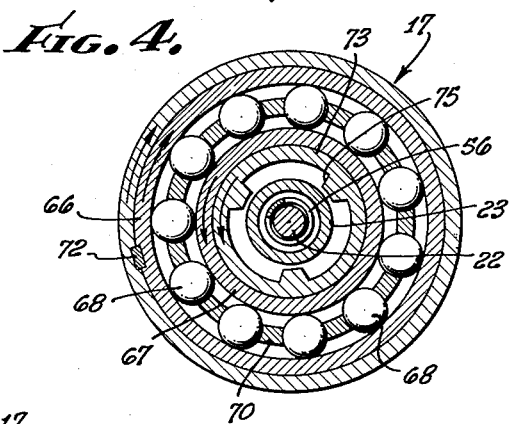
FIG. 4 is a sectional view taken along the line 4—4 of FIG. 2.

In a reversing operation, a short, quick upward movement is given to the machine spindle which raises the housing 17 relative to the drive spindle 23. The pins 16 disengage from the splines 61 and instead they engage the splines 75 on the reversing sleeve 73. The tap is now driven in the reverse direction, the drive being as illustrated in FIG. 4. The outer ball race 66 drives the ball 68 in the direction shown in FIG. 4 and the balls in turn drive the inner race 67 and the reversing sleeve 73 in the reverse direction. The tap is driven in the reverse direction through the splines 75 and the drive pins 60. In the type of attachment shown, the operator does not apply any lead pressure on the tap; the free axial float in the attachment automatically permits the tap to follow its own lead. Torque only is applied to the tap.

Previous known ball-bearing reversing devices were subject to the limitations which have been outlined in the introduction hereto. In the herein invention as previously explained, the reversing ball-bearing 65 is modified from commercially available bearings. The clearance between the balls and the races is reduced to .0001 inch from what it normally would be, i.e., .0010 to .0015 inch. As explained, during reversing operations, the ball retainer 70 is held against rotation by the stop-rod 13. With the modified bearing as described, the performance is made more effective and is improved to the extent stated in the foregoing. Using an angular contact bearing with the loading applied from the ball clutch through the thrust bearing to the inner race of the reversing bearing, the balls 68 revolve on a central axis, that is, an axis through the center of the ball. Skidding of the balls in the races is avoided and consequently, friction and heating are reduced and minimized and in that manner the performance is improved to the degree stated in the introduction hereto.

The foregoing disclosure is representative of a preferred form of the invention and is to be interpreted in an illustrative rather than a limiting sense. The invention is to be accorded the full scope of the claims appended hereto.

What is claimed is:

1. In a reversible tool-holder having a driving component, a driven component, torque transmitting means for transmitting direct drive between said components torque transmitting members for transmitting torque in reverse direction between said components and means for selectively operating one or the other of said torque transmitting means, said reverse driving means comprising a ball race having balls and means comprising a thrust bearing interposed between the direct drive means and reverse drive means.

2. The device of claim 1 when the thrust bearing is positioned to transmit axial thrust to the inner member of the ball race of the reverse driving means.

3. In a reversible tool holder having a driving component, a driven component, torque transmitting means for transmitting direct drive between said components, an adjustable clutch for limiting the torque transmitted to said driven component, torque transmitting members for transmitting torque in reverse direction between said components, means for selectively operating one or the other of said torque transmitting means, said reverse driving means comprising a ball race having balls, and means comprising a thrust bearing interposed between the direct drive means and reverse drive means, said thrust bearing being so positioned that the axial thrust of said adjustable clutch is transmitted to the inner ball race of the reverse driving means.

4. In a reversible tool holder having a driving component, a driven component, torque transmitting means for transmitting direct drive between said components, an adjustable clutch for limiting the torque transmitted to said driven component, torque transmitting members for transmitting torque in reverse direction between said components, means for selectively operating one or the other of said torque transmitting means, said reverse driving means comprising an angular contact ball-bearing comprising an outer ball race and an inner ball race having balls interposed therewithin, and means comprising a thrust bearing interposed between the direct drive means and the reverse drive means and positioned to impose the axial thrust of the said clutch on the inner race of the said reverse driving means.

5. The device of claim 4 wherein the ball races and balls of the reverse driving means are made to have a clearance therebetween of the order of .0001 inch.

6. In a reversible tool holder having a driving component, a driven component, torque transmitting means for transmitting direct drive between said components, torque transmitting members for transmitting torque in reverse direction between said components and means for selectvely operating one or the other of said torque transmitting means, said reverse driving means comprising an angular contact ball-bearing having an inner ball race and an outer ball race, having balls interposed therewithin, the ball races and balls of the said reversing ball-bearing being made to have a clearance therebetween of the order of .0001 inch.

7. The device of claim 6 wherein the reversing ball bearing is an angular contact ball-bearing and means for loading the said reversing ball-bearing by applying axial thrust to the inner ball race thereof.

8. In a ball-bearing driving device in combination, means comprising an angular contact ball-bearing, including an outer ball race having a circular groove which is unsymmetrical in cross-section, an inner ball race, a ball retainer and balls interposed between said races, means for driving the outer race in one direction whereby the inner race is driven in the opposite direction through the said balls, and means for loading the said device by applying an axial thrust to the inner ball race.

9. The device of claim 8 including means for holding the ball retainer against rotation.

10. The device of claim 9 wherein the ball races and balls are made to have a clearance therebetween of the order of .0001 inch.

11. A device as in claim 1 wherein the said ball race comprises inner and outer members and the said thrust bearing is positioned to transmit axial thrust to one of said members.

12. In a reversible tool holder having a driving component, a driven component, torque transmitting means for transmitting direct drive between said components, an adjustable clutch for limiting the torque transmitted to said driven component, torque transmitting members for transmitting torque in reverse direction between said components, means for selectively operating one or the other of said torque transmitting means, said reverse driving means comprising a ball race having balls and race members, and means comprising a thrust bearing interposed between the direct drive means and reverse drive means, said thrust bearing being so positioned that the axial thrust of said adjustable clutch is transmitted to one of the race members.

References Cited in the file of this patent

UNITED STATES PATENTS 2,234,962     Cislak _____ Mar. 18, 1941

FOREIGN PATENTS 748,091     Great Britain _____ Apr. 18, 1956